Feb. 20, 1934.  F. E. SCHWENTLER  1,947,675
TRUCK BRAKE RIGGING
Filed July 10, 1931   4 Sheets-Sheet 1
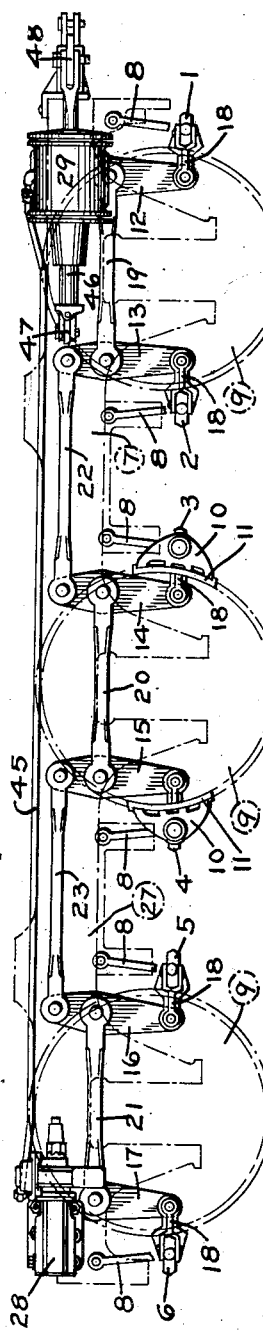
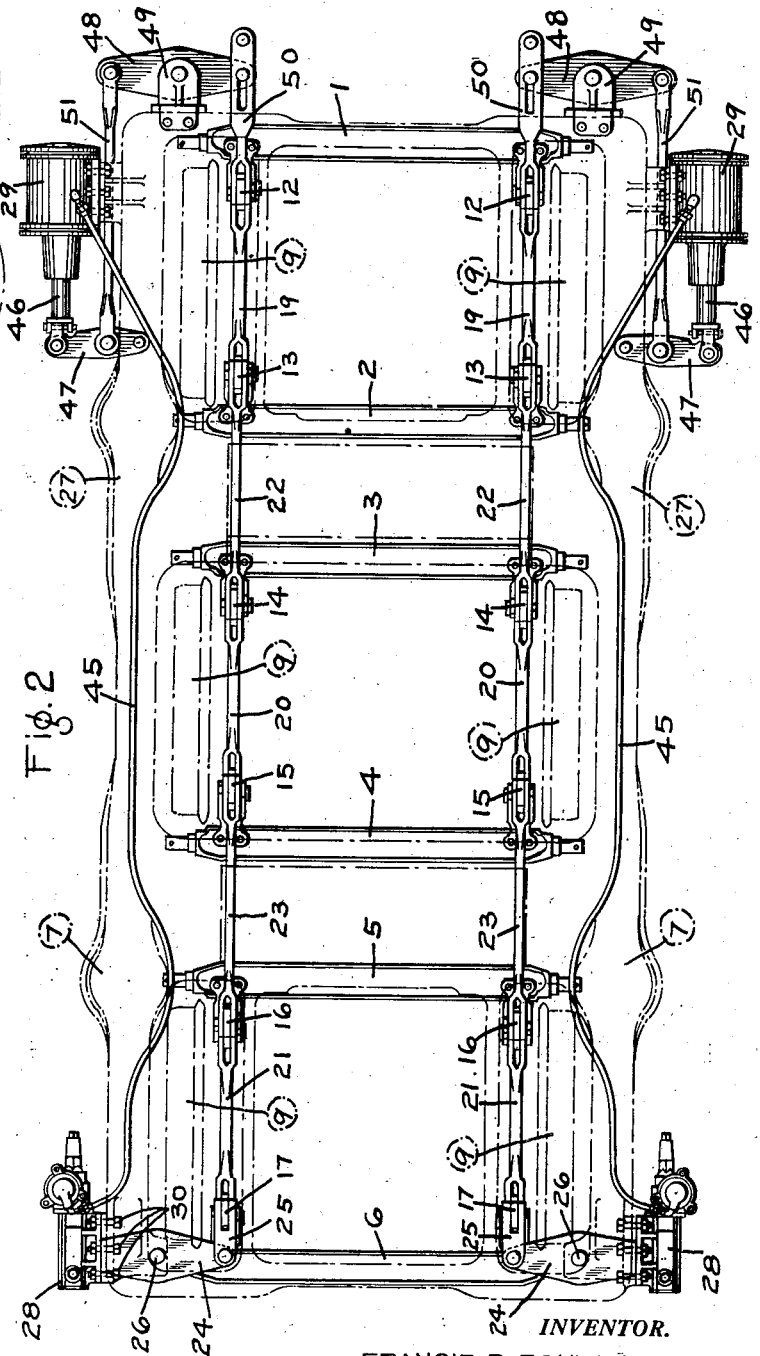
INVENTOR.
FRANCIS E. SCHWENTLER
By *Wm. W. Cady*
ATTORNEY.

Feb. 20, 1934.    F. E. SCHWENTLER    1,947,675
TRUCK BRAKE RIGGING
Filed July 10, 1931    4 Sheets-Sheet 2
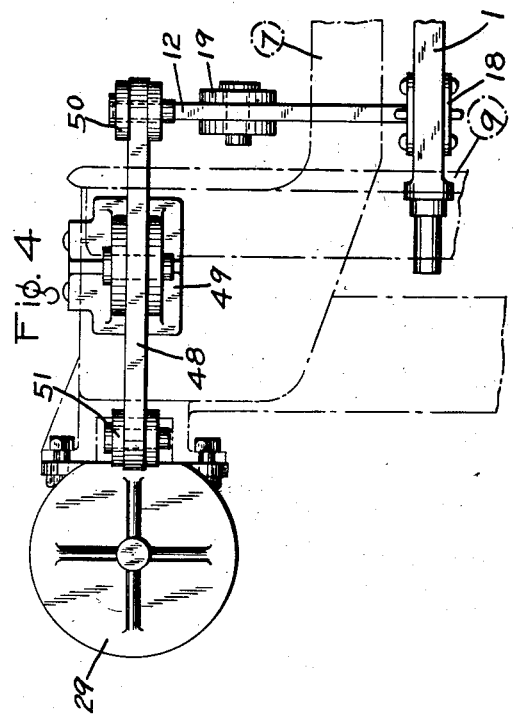
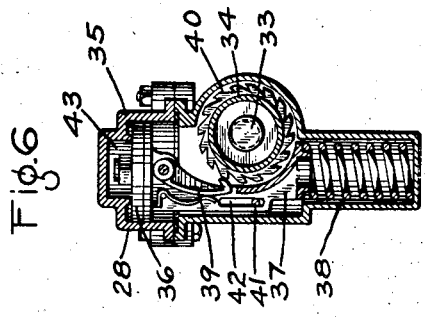
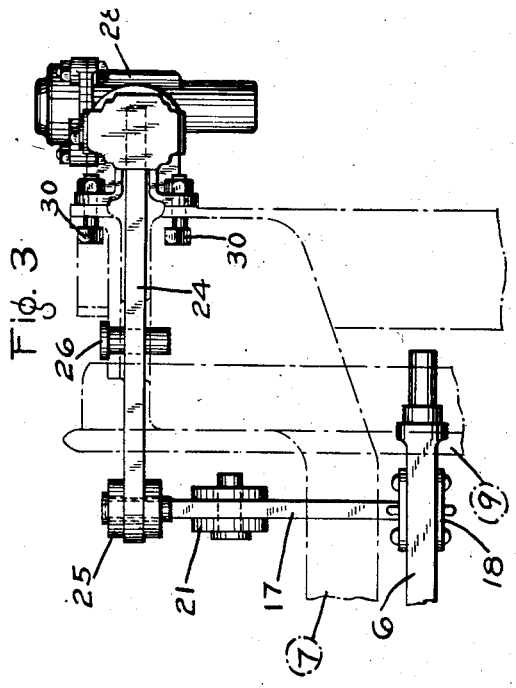
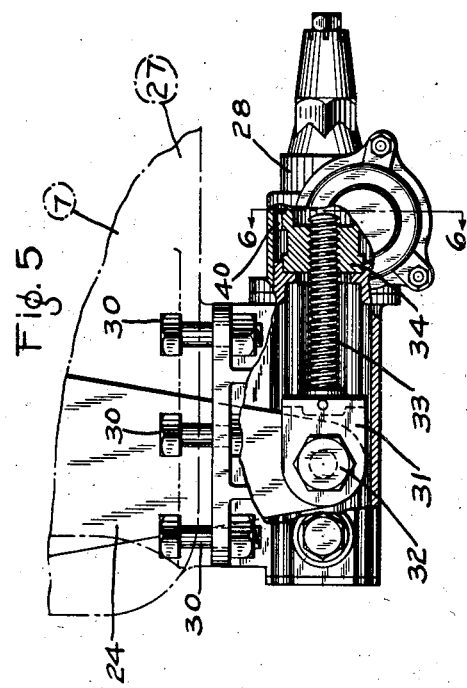
INVENTOR.
FRANCIS E. SCHWENTLER
By *Wm. M. Cady*
ATTORNEY.

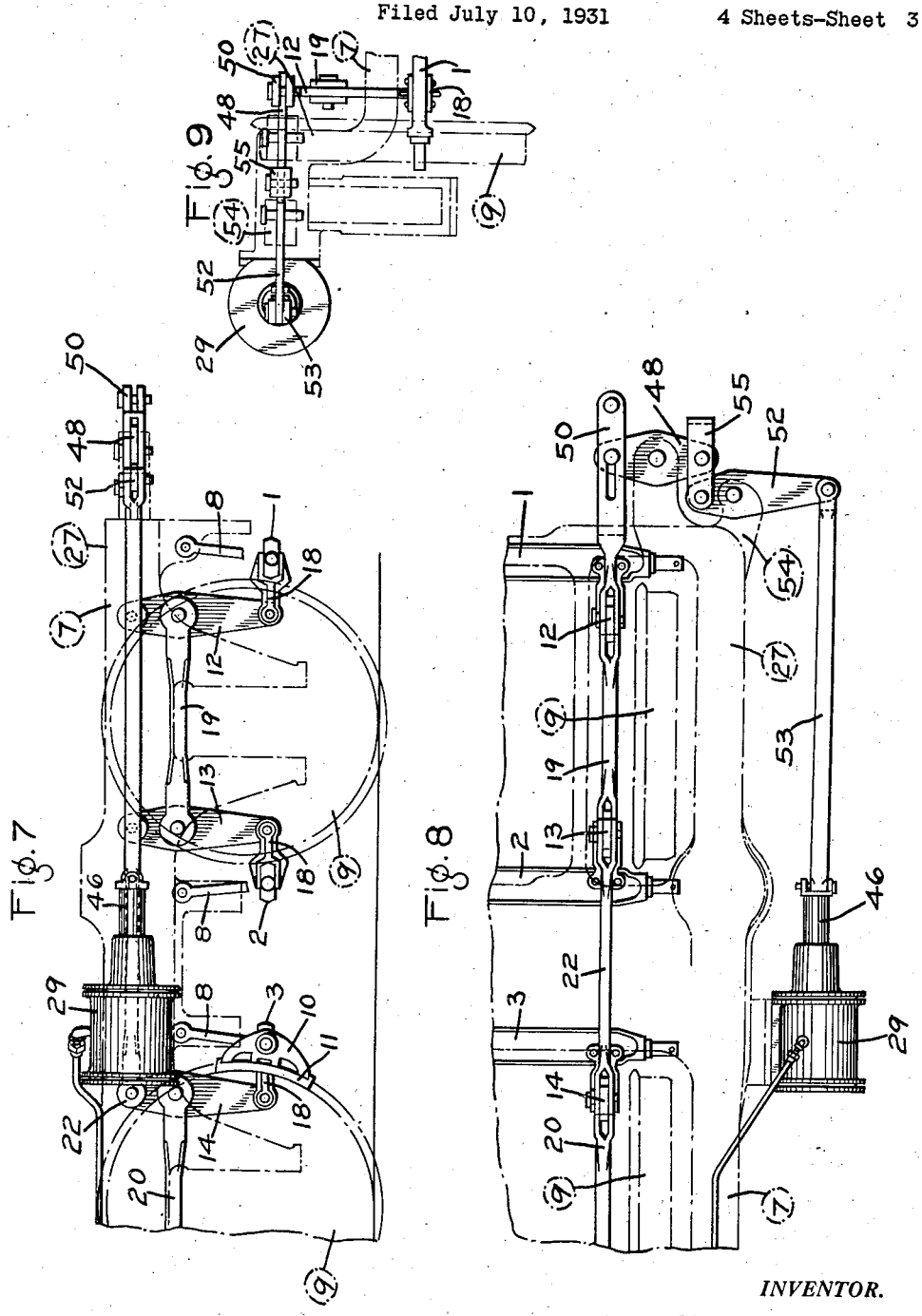

Feb. 20, 1934.    F. E. SCHWENTLER    1,947,675
TRUCK BRAKE RIGGING
Filed July 10, 1931    4 Sheets-Sheet 4
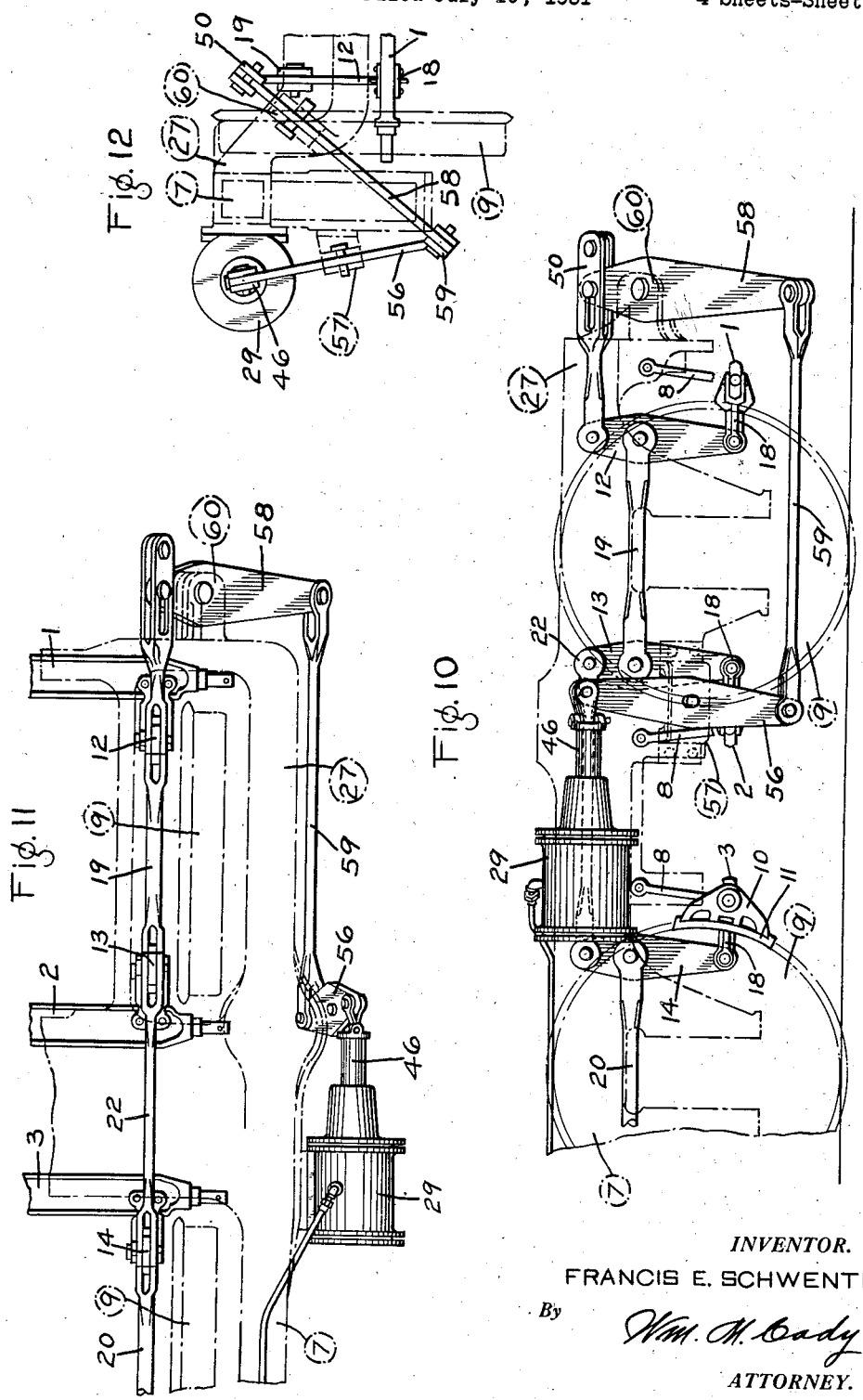
INVENTOR.
FRANCIS E. SCHWENTLER
By Wm. M. Cady
ATTORNEY.

Patented Feb. 20, 1934

1,947,675

UNITED STATES PATENT OFFICE 1,947,675

TRUCK BRAKE RIGGING

Francis E. Schwentler, St. Louis, Mo., assignor to The American Brake Company, St. Louis, Mo., a corporation of Missouri Application July 10, 1931. Serial No. 549,817

4 Claims. (Cl. 188—203)

This invention relates to brake equipment for railway car trucks and more particularly to that type of equipment having a system of operatively connected brake levers and rods which extends longitudinally of the truck and is arranged between the side members of the truck frame and also having a brake cylinder and an automatic slack adjuster mounted on the outer side of one of the side members of the truck frame and operatively connected to said system.

An object of my invention is to provide an improved brake equipment of the above mentioned type in which the brake cylinder and slack adjuster are so arranged on the outer side of a side member of the truck frame that the operating connections therefrom to the operatively connected brake levers and rods will be short and that a small number of such connections will be required.

Other objects and advantages will appear in the following more detailed description of the invention.

In the accompanying drawings; Fig. 1 is a side elevational view of a truck brake equipment embodying my invention, the truck frame and truck wheels being shown in dot and dash lines; Fig. 2 is a plan view of the same; Fig. 3 is an enlarged end elevational view of a portion of one end of the equipment; Fig. 4 is an enlarged end elevational view of a portion of the other end of the equipment; Fig. 5 is an enlarged plan view, partly in section, of an automatic slack adjuster; Fig. 6 is a vertical sectional view taken on the line 6—6 of Fig. 5; Fig. 7 is a side elevational view of a portion of the equipment embodying a modification of the invention; Figs. 8 and 9 are plan and end elevational views, respectively, of the same; Fig. 10 is a side elevational view of a portion of the equipment embodying another modification of the invention; and Figs. 11 and 12 are plan and end elevational views, respectively, of the same.

In the drawings, I have illustrated my truck brake equipment as comprising brake beams 1, 2, 3, 4, 5 and 6 which, adjacent their ends, are supported from the truck frame 7 by the usual hangers 8. These brake beams are arranged one on each side of each pair of truck wheels 9 and each beam carries a brake head 10 to which a brake shoe 11 is secured for engagement with the tread of one of the wheels 9. In the drawings the truck illustrated is of the six wheel type and the brake heads and shoes for one of the center wheels is shown, but it will be understood that each end of each brake beam is provided with a brake head and shoe.

The equipment also comprises two sets of operatively connected rods and levers which may be supported upon the truck frame in the usual well known manner. One of these sets is arranged at either side of the truck and may comprise vertically disposed live levers 12, 13, 14, 15 and 16 and a dead lever 17, each of which, at its lower end is operatively connected to an adjacent brake beam by a clevis connection 18.

The brake levers 12 and 13, 14 and 15 and 16 and 17 are operatively connected together, intermediate their ends, by rods 19, 20 and 21 respectively.

The upper ends of the levers 13 and 14 and 15 and 16 are operatively connected together by rods 22 and 23 respectively.

The upper end of the dead lever 17 is pivotally connected to the inner end of a horizontally disposed fulcrum lever 24 by a clevis connection 25, said lever being pivotally connected, intermediate its ends, to one end of the truck frame by a pin 26.

Located at one end of the truck frame and secured to one of the side members 27 of the truck frame is an automatic slack adjuster 28 and located at the opposite end of the frame and secured to the same side member 27 is a brake cylinder 29.

The slack adjuster 28 comprises a casing which is secured directly against the outer side face of the side member 27 by bolts 30 and has a hollow portion in which an adjustable fulcrum block 31 is slidably guided. The outer end of the fulcrum lever 24 is pivotally connected directly to the fulcrum block 31 by a pin 32. For varying the position of the fulcrum block 31 to take up slack in the equipment, an adjusting screw 33 is provided which passes through a rotatable screw-threaded adjusting nut 34, the screw threads of the nut operatively engaging the adjusting screw 33.

The slack adjuster casing also comprises a cylinder 35 which, at one side of the adjusting nut 34, contains a piston 36 having a stem 37 which stem, at its lower end, is engaged by a coil spring 38.

Pivotally connected to the stem 37 is a pawl 39 which is adapted to operatively engage ratchet teeth 40 on the adjusting nut 34.

The piston 36 and pawl 39 are guided and maintained in their proper operating positions by means of a bolt or pin 41 secured in the casing and extending through an elongated slot 42 formed in the piston stem 37.

The piston chamber 43, which is at one side of the piston 36, is normally connected to the non-pressure chamber of the brake cylinder 29 by way of a pipe 45, said brake cylinder being secured against the outer side face of the side member 27 of the truck frame.

The brake cylinder 29 may be of the usual type comprising a piston (not shown) having a piston rod 46, which is pivotally connected, at its outer end to the outer end of a horizontally disposed brake cylinder lever 47 pivotally connected at its inner end to the truck frame.

At the brake cylinder end of the truck a horizontally disposed equalizing lever 48 is provided which is pivotally connected intermediate its ends, to a bracket 49 secured to the end of the truck frame. The inner end of this lever is operatively connected to the upper end of the live lever 12 by a rod 50 and the outer end of the lever has one end of a pull rod 51 pivotally connected thereto, the opposite end being pivotally connected to the brake cylinder lever 47 intermediate the ends of said lever.

In operation, when fluid under pressure is supplied to the brake cylinders 29, the pistons thereof move to force the piston rods 46 outwardly, operating both systems of levers connected therewith and connected with the slack adjusters 28 to move the brake beams to apply the brake shoes to the treads of the wheels 9.

Upon thus applying the brakes, if due to wear of the brake shoes or for any other reason the movement of the piston of a brake cylinder exceeds the normal amount, the piston will uncover a brake cylinder port which is open to the pipe 45, so that fluid under pressure will be supplied from the pressure side of the brake cylinder piston through pipe 45, to the piston chamber 43 of the slack adjuster and the piston 36 will be operated to shift the pawl 39 to engage a tooth 40 of the adjusting nut 34.

When the brakes are released, fluid under pressure is released from the piston chamber 43 by way of pipe 45 and the non-pressure chamber of the brake cylinder, and the spring 38, which has been compressed, acts to retract the piston 36, so that the pawl 39 actuates the adjusting nut 34 to draw up the adjusting screw 33 and fulcrum block 31, thereby operating the fulcrum lever 24 and consequently the dead lever 17 to take up slack in the equipment.

In Figs. 7, 8 and 9 a modification of the connection from the brake cylinder to the equalizing lever 48 is illustrated. In this modification the brake cylinder faces in the opposite direction to that of the brake cylinder shown in Figs. 1, 2 and 4 and the outer end of the piston rod 46 is operatively connected to the outer end of a horizontally disposed brake cylinder lever 52 through the medium of a push rod 53, said lever being pivotally connected to a lug 54 projecting outwardly from the brake cylinder end of the truck frame. The inner end of the brake cylinder lever 52 is operatively connected to the outer end of the equalizing lever 48 through the medium of a clevis 55.

In Figs. 10, 11 and 12 a modification of the connection from the brake cylinder to the rod 50 is illustrated. In this modification the brake cylinder faces in the same direction as the brake cylinder in Figs 7, 8 and 9, and the piston rod 46 is directly connected to the upper end of a vertically disposed equalizing brake cylinder lever 56, which intermediate its ends is pivotally connected to a bracket 57 secured to the outer face of the side member 27 of the truck frame. The lower end of the lever 56 is operatively connected to the lower end of a lever 58 by a pull rod 59, said lever being pivotally connected intermediate its ends to a bracket 60 projecting outwardly from the end of the truck frame. The upper end of the lever 58 is pivotally connected to the rod 50.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a truck brake equipment, the combination with a truck frame having side members, of a system of operatively connected brake elements carried by said truck frame, said elements including a dead lever, a fulcrum lever pivotally connected to said truck frame and operatively connected at one end to said dead lever, a slack adjuster mounted on one of said side members, and an adjustable fulcrum block included in said slack adjuster directly connected to the other end of said fulcrum lever.

2. In a truck brake equipment, the combination with a truck frame having side members, of a system of operatively connected brake elements carried by said truck frame and disposed between said side members, one of said elements being a live lever and another of said elements being a dead lever, a brake cylinder for operating said brake elements and carried directly by one of said side members, means operatively connecting the brake cylinder to said live lever, a slack adjuster carried directly by said side member, an adjustable block included in said slack adjuster, a fulcrum lever pivotally mounted on said truck frame having one end directly connected to said block and having the other end connected to said dead lever, and means included in said slack adjuster controlled by the operation of said brake cylinder for varying the position of said block to take up slack.

3. In a truck brake equipment, the combination with a truck frame having side members, of a system of operatively connected brake elements carried by said truck frame and disposed between said side members, one of said elements being a live lever and another of said elements being a dead lever, a brake cylinder for operating said brake elements and carried directly by one of said side members, means operatively connecting the brake cylinder to said live lever, a slack adjuster carried directly by said side member, an adjustable block included in said slack adjuster, a fulcrum lever pivotally mounted on said truck frame having one end directly connected to said block and having the other end connected to said dead lever, and fluid pressure means controlled by the operation of said brake cylinder for varying the position of said block.

4. In a truck brake equipment having spaced longitudinally extending side members, of a system of operatively connected brake elements disposed between said side members and supported by said truck frame, said elements including a live lever located at one end of the truck frame and a dead lever located at the opposite end of the truck frame, a brake cylinder secured to the outer side of one of said side members and operatively connected to said live lever, a slack adjuster comprising a casing secured to said outer side of the side member, said casing having a slot formed therein, an adjustable block mounted in said casing, a fulcrum lever pivotally mounted on the truck frame having one end operatively connected to said dead lever and having its opposite end extending through said slot and directly connected to said block, and means for varying the position of said block to take up slack.

FRANCIS E. SCHWENTLER.